(12) United States Patent
Lin

(10) Patent No.: US 6,816,740 B2
(45) Date of Patent: Nov. 9, 2004

(54) RECHARGE APPARATUS FOR HOLDING THE RECHARGEABLE DEVICE

(75) Inventor: Chien-Min Lin, Junghe (TW)

(73) Assignee: High Tech Computer Corp., Taoyuan (TW)

( * ) Notice: Subject to any disclaimer, the term of this patent is extended or adjusted under 35 U.S.C. 154(b) by 665 days.

(21) Appl. No.: 09/809,316

(22) Filed: Mar. 16, 2001

(65) Prior Publication Data

US 2001/0029195 A1 Oct. 11, 2001

(30) Foreign Application Priority Data

Apr. 7, 2000 (TW) ...................................... 89205575 U

(51) Int. Cl.⁷ ................................................ H04B 1/38
(52) U.S. Cl. ...................... 455/573; 455/572; 320/113; 320/115
(58) Field of Search ................................ 455/572, 573, 455/343.2, 343.1; 379/446; 320/110, 113, 115

(56) References Cited

U.S. PATENT DOCUMENTS

| | | | | |
|---|---|---|---|---|
| 4,588,938 A | * | 5/1986 | Liautaud et al. | 320/115 |
| 5,280,229 A | * | 1/1994 | Faude et al. | 320/110 |
| 5,347,208 A | * | 9/1994 | Iida | 320/113 |
| 5,473,242 A | * | 12/1995 | McKenna | 320/113 |
| 5,946,637 A | * | 8/1999 | Umbach et al. | 455/573 |
| 5,974,334 A | * | 10/1999 | Jones, Jr. | 455/556.2 |
| 6,124,699 A | * | 9/2000 | Suzuki et al. | 320/110 |
| 6,127,802 A | * | 10/2000 | Lloyd et al. | 320/113 |
| 6,204,632 B1 | * | 3/2001 | Nierescher et al. | 320/116 |
| 6,226,536 B1 | * | 5/2001 | Miyashita | 455/567 |

* cited by examiner

Primary Examiner—Edward F. Urban
Assistant Examiner—Duy K Le
(74) Attorney, Agent, or Firm—Rabin & Berdo, P.C.

(57) ABSTRACT

A recharge apparatus for holding the rechargeable device and battery includes the cradle top and the cradle base. The cradle top includes the elastic gate, the battery-fixing clip, and the charge area. The elastic gate is an opening for inserting the rechargeable battery, and capable of rebounding against pressure so that the elastic gate does not clip the user's finger during operation, and also enhances the appearance as well as being dust-proof. The battery-fixing clip is used for clipping the rechargeable battery tightly. The charge area is an inserting area for charging the rechargeable devices, and has a stand pin to hold the rechargeable devices steadily by inserting the stand pin into the bottom of the rechargeable device. The cradle base assembled with the cradle top includes the elastic joint and recharge PCB (printed circuit board). One end of the elastic joint is designed as the upward curve to touch the rechargeable battery. When the rechargeable battery is inserted to recharge, the elastic joint is pressed downward, resulting in an upward rebounding force. In this way, the rechargeable battery is connected to the recharge PCB via the elastic joint.

13 Claims, 4 Drawing Sheets

RECHARGE APPARATUS FOR HOLDING THE RECHARGEABLE DEVICE

This application incorporates by reference Taiwanese application Ser. No. 089205575, Filed Apr. 7, 2000.

BACKGROUND OF THE INVENTION

1. Field of the Invention

The invention relates in general to a recharge apparatus, and more particularly to the recharge apparatus that steadfastly holds a rechargeable device.

2. Description of the Related Art

With the rapid evolution of high technology, electronic products are being developed quickly. Recently, consumers increasingly require portable products such as the portable storage apparatus and the communication apparatus, with the most popular portable products being the cellular phone and handheld computer. The recharge apparatus also plays an important role due to the limited power supply present in the portable product. The recharge apparatus can provide power for the portable product as well as recharge the battery either simultaneously or separately. However, the contact between the product and the recharge apparatus (i.e. battery and cradle) is not tight so that the recharge quality is easily affected by careless touching or swaying of the assembly when recharging is ongoing.

SUMMARY OF THE INVENTION

It is therefore an object of the invention to provide a recharge apparatus able to tightly hold the rechargeable device such as a battery or hand held computer, so that the charge quality is not affected due to a careless touch or sway.

According to the objective of the invention, a recharge apparatus for holding the rechargeable device is provided for charging the rechargeable battery and devices, including storage/communication products, especially cellular phone and handheld computer. The recharge apparatus includes the cradle top and cradle base. The cradle top that is used for inserting the rechargeable devices includes the elastic gate, the battery-fixing clip, and the charge area. The elastic gate located on the upper cradle top is an opening for inserting the rechargeable battery that is capable of rebounding against pressure so that it does not clip the user's finger during operation. The elastic gate also enhances the appearance of the cradle top as well as being dust-proof Additionally, the polarity labeling area is marked within the elastic gate in order to indicate the direction for inserting the rechargeable battery. The battery-fixing clip is used for clipping the rechargeable battery tightly. The charge area is an inserting area for charging the rechargeable device and has a stand pin to hold the rechargeable device steadfastly by inserting the stand pin into the bottom of the rechargeable device. The cradle base assembled with the cradle top includes the elastic joint and recharge PCB (printed circuit board). The elastic joint is used for connecting the recharge PCB to the rechargeable battery, wherein one end of the elastic joint is designed as the upward curve to touch the rechargeable battery. When the rechargeable battery is inserted for recharging, the elastic joint is pressed downward resulting in an upward rebounding force. The rechargeable battery is then connected to the recharge PCB via the elastic joint.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
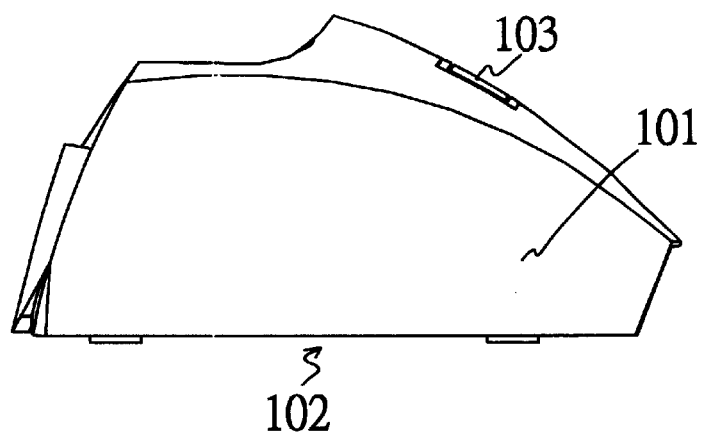
FIG. 1 is a lateral view of a recharge apparatus for holding the rechargeable device according to the invention.

Referring to FIG. 1, which depicts a lateral view of a recharge apparatus for holding the rechargeable device according to the invention, the recharge apparatus includes a cradle top assembly that includes the cradle top 101, and the cradle base 102, wherein the cradle top 101 covers a space, and has an elastic gate 103.

Figure 2:
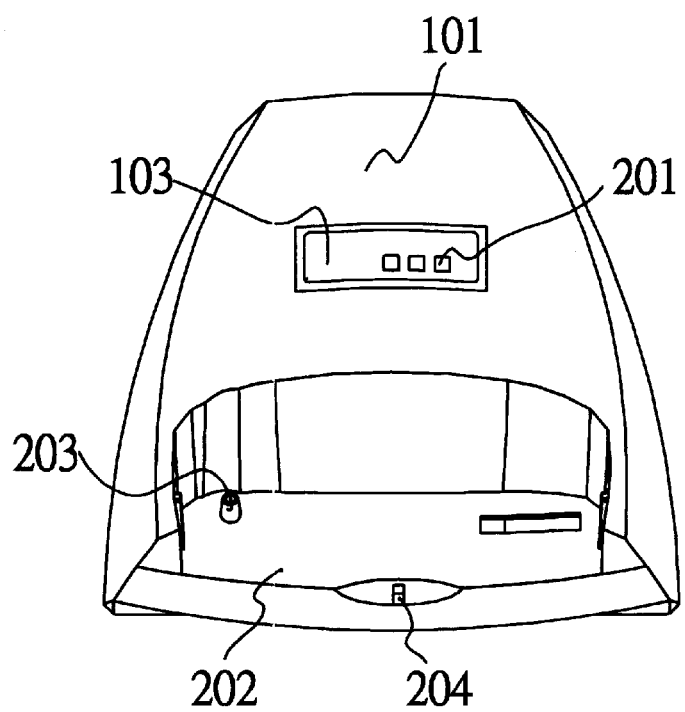
FIG. 2 is a top view of the recharge apparatus according to the invention.

Referring to FIG. 2, which depicts a top view of the recharge apparatus according to the invention, the charge area 202 is used for placing the rechargeable device such as storage apparatus or communication apparatus (i.e. cellular phone and the handheld computer). A stand pin 203 located within the charge area 202 is designed for steadfastly holding the rechargeable device. The function of the indicator light 204 is to exhibit the charge condition; when the light is on, charging is proceeding.

Figure 3:
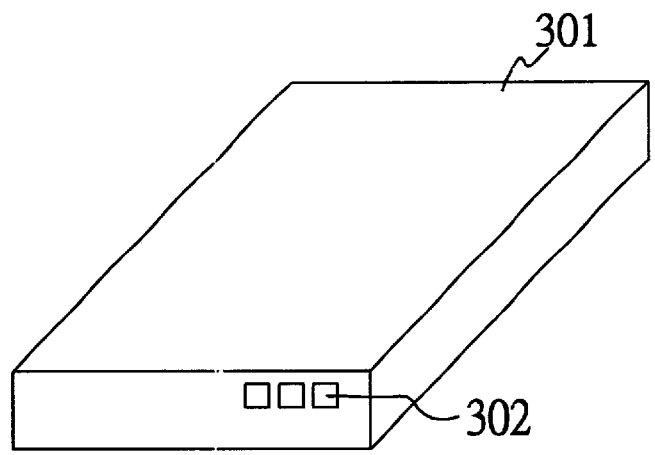
FIG. 3 is a three-dimensional plot of the rechargeable battery.

The elastic gate 103 is an opening for inserting the rechargeable battery and is capable of rebounding against pressure. When the rechargeable battery is removed from the charger, the elastic gate 103 automatically closes. Therefore, the elastic gate 103 does not clip the user's finger during operation, is dust-proof, and enhances the appearance of the cradle top. A polarity labeling area 201 is located on the surface of the elastic gate 103 in order to indicate the polarity of the rechargeable battery. Referring to FIG. 3, which depicts a three-dimensional plot of the rechargeable battery, the recharge contact area 302 is aimed at the polarity labeling area 201 and inserted into the recharge apparatus. With this convenient design, the charge direction is clearly indicated, and users don't have to check the polarity position of the rechargeable battery 301 during insertion.

Figure 4:
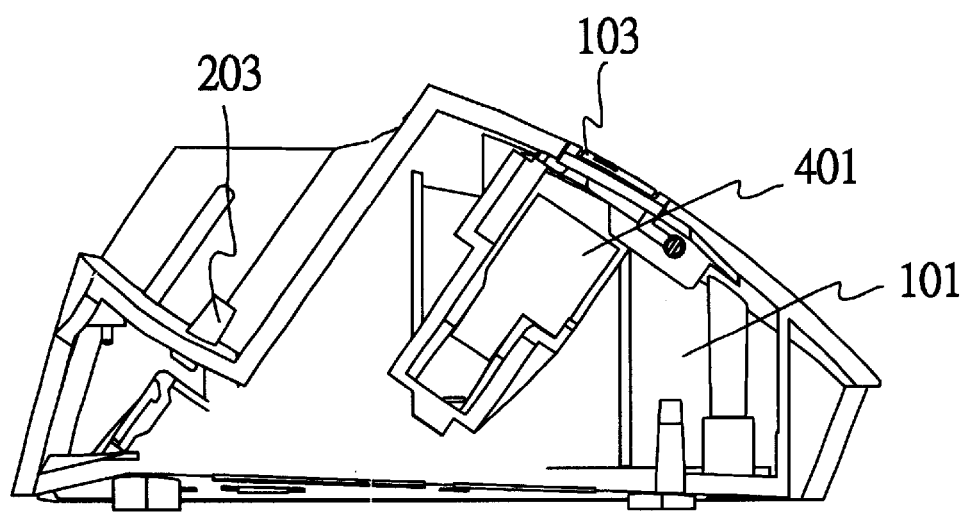
FIG. 4 is a sectional view of the recharge apparatus according to the invention.

Referring to FIG. 4, in which a sectional view of the recharge apparatus according to the invention is presented, the battery-fixing clip 401 is located underneath the elastic gate 103 and the material is preferably chosen to be a plastic film possessing a hard surface and a soft inside, such as polyethylene terephalate (PET) and Mylar. When the rechargeable battery 301 is inserted, the battery-fixing clip 401 is able to clip it tightly due to the appropriate design in terms of mechanism and material. Although a pair of the battery-fixing clips 401 is preferably chosen, the number of that is not limited herein.

Figure 5:
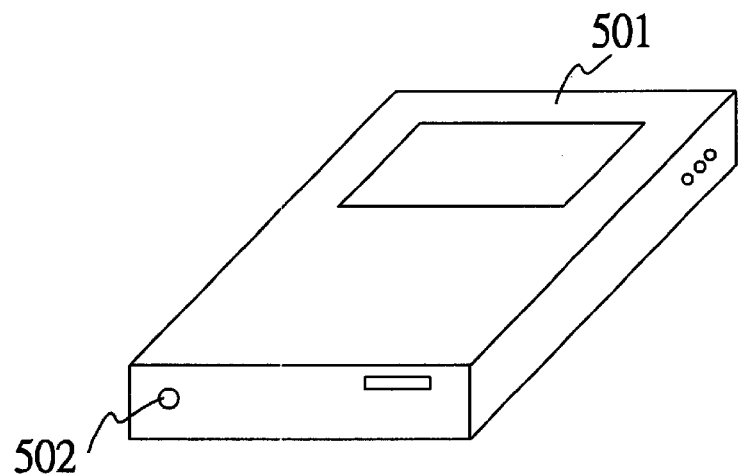
FIG. 5 is a three-dimensional plot of the handheld computer.
Figure 6:
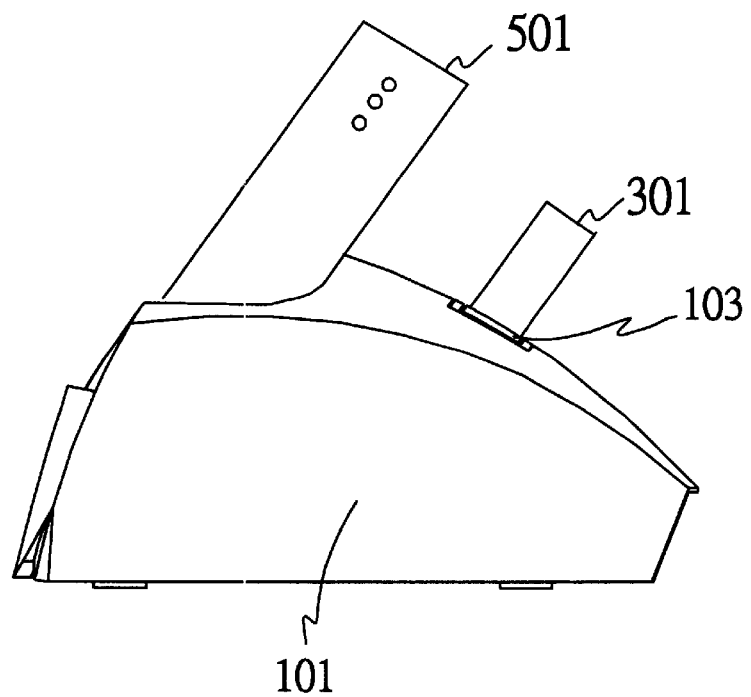
FIG. 6 is a lateral view of the recharge apparatus on which the handheld computer and the rechargeable battery are placed according to the invention.

Referring to FIG. 5, which depicts a three-dimensional plot of the handheld computer, the bottom of the handheld computer has a deep dimple 502. When the handheld computer is placed in the charge area 202, the stand pin 203 pierce into the deep dimple 502 and hold the handheld computer steadfastly so that the charge quality is not affected due to the careless touch or sway. A lateral view of the recharge apparatus on which the handheld computer and the rechargeable battery are placed according to the invention is presented in FIG. 6.

Figure 7:
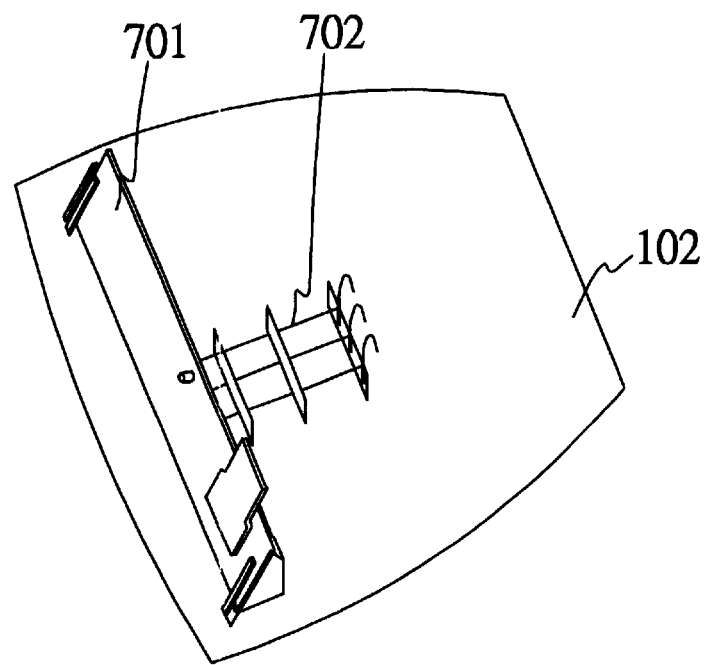
FIG. 7 is a top view of the cradle base of the recharge apparatus according to the invention.
Figure 8:
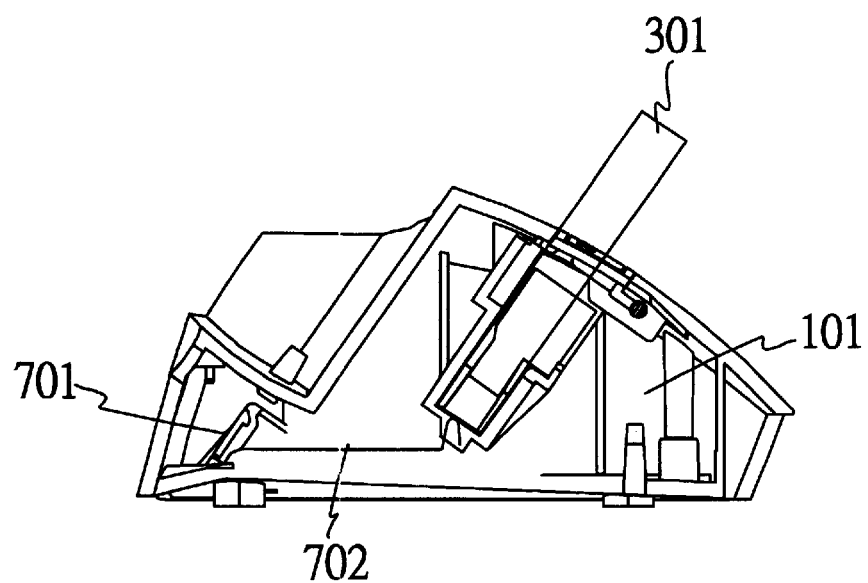
FIG. 8 is a sectional view of the recharge apparatus when the rechargeable battery is placed in the charge area according to the invention.

Referring to FIG. 7, which depicts a top view of the cradle base of the recharge apparatus according to the invention, the cradle base 102 includes the elastic joint 702 and recharge PCB 701 (printed circuit board). The elastic joint 702 is elastic and curved upward. FIG. 8 shows a sectional view of the recharge apparatus when the rechargeable battery 301 is placed in the charge area 302. When the rechargeable battery 301 is inserted into the elastic gate 103, the elastic joint 702 is pressed downward, resulting in an upward rebounding force. The elastic joint 702 is capable of touching the rechargeable battery 301 closely due to its curve and elasticity, so that the rechargeable battery 301 is well connected with the recharge PCB 701 via the elastic joint 702. The number of the elastic joint 702 is preferably chosen to attain the objective of the invention, such as three; however, it is not limited.

In the preferred embodiment of the invention described herein, the advantages of recharge apparatus are listed below including:

1. The elastic gate does not clip the user's finger and the cradle top is more aesthetically pleasing and dust-proof The polarity labeling area 201 located on the surface of the elastic gate 103 readily indicates the polarity of the rechargeable battery.

2. The battery-fixing clip is able to tightly clip the rechargeable battery so that the charge quality is not affected due to careless touch or sway.

3. When the rechargeable device is inserted into the charge area, the stand pin tightly inserts into the deep dimple, therefore, the rechargeable device does not sway during the period of recharge.

4. The elastic joint with one end curved upward to touch the rechargeable battery is used for connect the rechargeable battery and the recharge PCB. When the rechargeable battery is inserted to recharge, the elastic joint is pressed downward, resulting in an upward rebounding force. This prevents the rechargeable battery from poor contact during recharge.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A recharge apparatus for holding a rechargeable device and a rechargeable battery, comprising:

a cradle top assembly, comprising:

a cradle top having an opening that provides access into a space disposed under the cradle top, the rechargeable battery being insertable through the opening to be received in the space:

an elastic gate located on an upper portion of the cradle top and covering the opening when the rechargeable battery is not received in the space, the elastic gate being moved by an insertion of the rechargeable battery through the opening, to a position in which the opening is not covered by the elastic gate, when the rechargeable battery is received in the space, the elastic gate being adapted to rebound against pressure when the rechargeable battery is removed from the space so that the elastic gate automatically closes the opening;

a battery-fixing clip located in the space and underneath the cradle top and the elastic gate, and tightly clipping the rechargeable battery from within the space and when the rechargeable battery is received in the space; and a charge area for charging the rechargeable device; and a cradle base assembled with the cradle top and comprising a recharge PCB (printed circuit board).

2. The recharge apparatus according to claim 1, wherein the elastic gate further comprises a polarity labeling area to indicate the polarity of the rechargeable battery.

3. The recharge apparatus according to claim 1, wherein the battery-fixing clip is a plastic film with a hard surface and a soft inside.

4. The recharge apparatus according to claim 3, wherein the battery-fixing clip is made of polyethylene terephalate (PET).

5. The recharge apparatus according to claim 3, wherein the battery-fixing clip is made of Mylar.

6. The recharge apparatus according to claim 1, wherein the battery-fixing clip is a pair.

7. The recharge apparatus according to claim 1, wherein the charge area further comprises a stand pin for tightly connecting to the rechargeable device.

8. The recharge apparatus according to claim 1, wherein the cradle base further comprises an elastic joint with one end connected to the charge PCB, and another end curved upward to closely contact the rechargeable battery.

9. The recharge apparatus according to claim 8, wherein there are three of the elastic joints.

10. The recharge apparatus according to claim 1, wherein the rechargeable device is a storage apparatus.

11. The recharge apparatus according to claim 10, wherein the storage apparatus is a handheld computer.

12. The recharge apparatus according to claim 1, wherein the rechargeable device is a communication apparatus.

13. The recharge apparatus according to claim 12, wherein the communication apparatus is a cellular phone.

* * * * *